United States Patent [19]
Johnson

[11] 3,983,375
[45] Sept. 28, 1976

[54] TILTESTER

[75] Inventor: Allen M. L. Johnson, Succasunna, N.J.

[73] Assignee: The United States of America as represented by the Secretary of the Army, Washington, D.C.

[22] Filed: Sept. 26, 1975

[21] Appl. No.: 617,214

Related U.S. Application Data

[63] Continuation-in-part of Ser. No. 472,324, May 22, 1974, abandoned.

[52] U.S. Cl. .......................... 235/151.3; 33/174 L; 73/116; 235/150.2
[51] Int. Cl.² ..................... G01D 1/00; G01M 1/14; G01M 19/00; G01L 15/00
[58] Field of Search ......... 235/151.3, 150.2, 150.25, 235/151.1; 33/174 L, DIG. 2; 324/71 R; 73/65, 116

[56] References Cited
UNITED STATES PATENTS 3,547,381  12/1970  Shaw .............................. 235/150.25
3,824,386  7/1974  Offereins ........................ 235/150.2

*Primary Examiner*—Malcolm A. Morrison
*Assistant Examiner*—Errol A. Krass
*Attorney, Agent, or Firm*—Nathan Edelberg; A. Victor Erkkila; Max Yarmovsky

[57]  ABSTRACT

A tilt testing device simultaneously measures the angle of tilt of a plurality of nozzles of a multi-nozzle rocket motor and the direction in which each nozzle is tilted. A programable calculator computes the composite effect that such nozzle tilt would have on spin, pitch and yaw of a missile in flight. The calculator displays the numerical value of the composite effect, indicates the acceptance or rejection of the inspected work piece, and, when desired, prints a record of the resultant calculations. The tilt tester utilizes an electromechanical-pneumatic combination to lower a plurality of alignment determining probes into the nozzles while the work piece is clamped against a reference surface. An indexing rotating sensor assembly scans each probe for its angle of tilt and sends signals to the calculator for interpretation and display.

7 Claims, 16 Drawing Figures

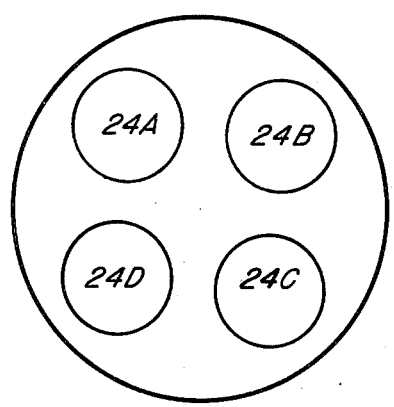
FIG.2
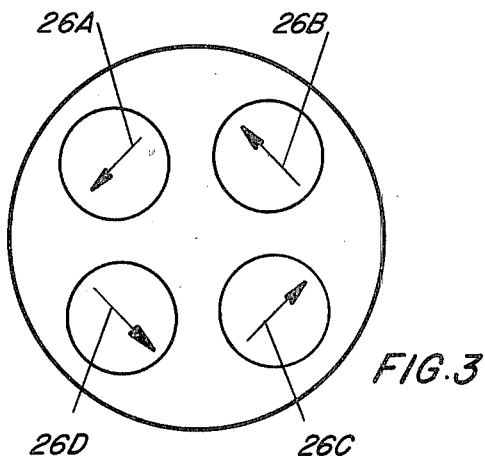
FIG.3
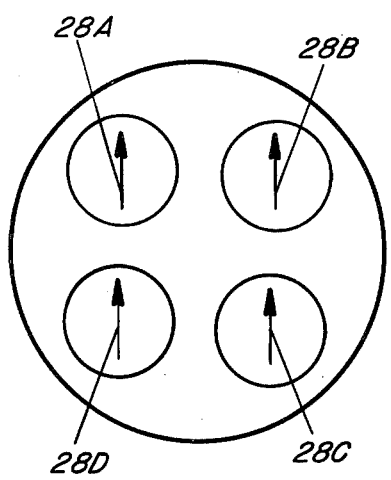
FIG.4
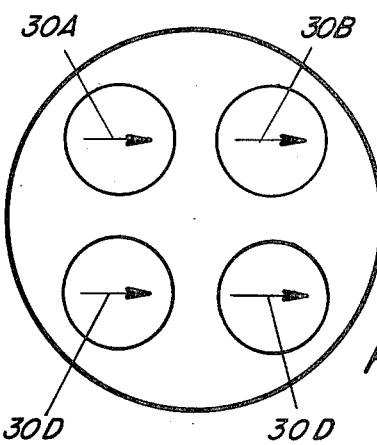
FIG.5
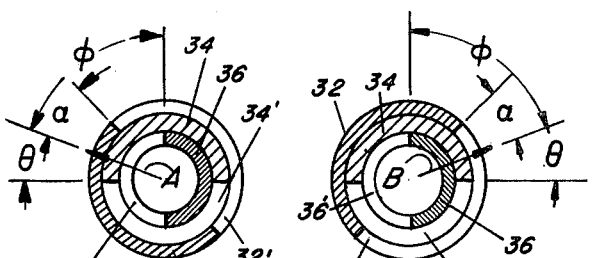
FIG.6
FIG.7
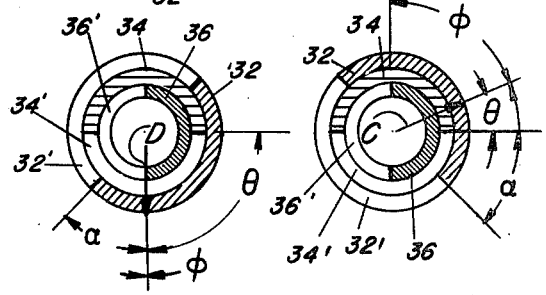
FIG.9
FIG.8

3,983,375

TILTESTER

GOVERNMENTAL INTEREST

The invention described herein may be manufactured, used and licensed by or for the Government for governmental purposes without the payment to me of any royalty thereon.

This application is a continuation-in-part of a prior application Ser. No. 472,324 filed on May 22, 1974, now abandoned, of Allen M. L. Johnson for Tiltester.

BACKGROUND OF THE INVENTION

Various means have been used in the prior art to ascertain the force vectors of tilted rocket nozzles without determining the degree of composite influence on rocket flight accuracy. Tilted nozzles are the natural result of conventional manufacturing tolerances and methods. In order to determine in advance the effect of tilt, prior art has used such instruments as a Hilger-Watts Optical collimator or a Sheffield Air Gage. The aforementioned instruments were used generally to measure only the angle of nozzle tilt. The problem with the collimator in such application is that it can inspect only one nozzle at a time. While the air gage can check a plurality of nozzles simultaneously, neither it nor the collimator is capable of measuring the magnitude and direction of tilt or the composite effect of tilt on spin, pitch and yaw.

The present equipment described herein overcomes the aforementioned problems by its unique design.

SUMMARY OF THE INVENTION

The present invention relates to an apparatus designed to measure the amount of tilt in individual nozzles of a multi-nozzle work piece, determine the direction of such tilt, compute the gross and net effect of tilt on spin, pitch and yaw of the rocket, indicate acceptance or rejection of inspected parts and print a record of resultant calculations. The testing system consists of four interrelated major components. An electro-pneumatic gaging device scans the work piece and generates a signal responsive to the tilt of each of the nozzles. The output signals from air to electric converters are fed into a multi-channel amplifier whose output is connected to an analog-digital converter, whose output is in turn electrically coupled to a programable calculator which converts the digital intelligence of the multi-channels into an output signal which can be read on a printer or seen on a visual go no-go indicator. The calculator output signal gives the composite effect of the combined tilt of all the nozzles on spin, pitch and yaw.

An object of the present invention is to provide a tilt tester, for testing a multi-nozzle work piece, in order to compute the composite effect of nozzle tilt on spin, pitch and yaw.

Another object of the present invention is to provide a tilt tester, for testing a multi-nozzle work piece, which can display the numerical value of the composite effect of nozzle tilt on spin, pitch and yaw.

Another object of the present invention is to provide a tilt tester, for testing a multi-nozzle work piece, which can signal the acceptance or rejection of the inspected part on the basis of the composite effect of nozzle tilt on spin, pitch and yaw, when compared to predetermined limits.

Another object of the present invention is to provide a tilt tester, for testing a multi-nozzle work piece, which can print a record of resultant calculations on command of the composite effect of nozzle tilt on spin, pitch and yaw.

A further object of the present invention is to provide a tilt tester, for testing a multi-nozzle work piece, to utilize the averaging of tilt effect to permit a fourfold increase in nozzle manufacturing tolerance with no decrease in flight accuracy.

For a better understanding of the present invention, together with other and further objects thereof, reference is made to the following description taken in connection with the accompanying drawings.

BRIEF DESCRIPTION OF THE DRAWINGS

FIG. 2 is a rear view of a typical rocket nozzle cluster.

FIG. 3 is a rear view of a typical rocket nozzle cluster showing force vectors contributing to a maximum gross error effect of tilt which causes clockwise spin.

FIG. 4 is a rear view of a typical rocket nozzle cluster showing force vectors contributing to a maximum gross error effect of tilt which causes pitch up.

FIG. 5 is a rear view of a typical rocket nozzle cluster showing force vectors contributing to a maximum gross error effect of tilt which causes yaw right.

FIGS. 6, 7, 8 and 9 are diagrammatic views which show the principal modes of flight characteristics, spin, pitch and yaw, in proportion to their angular relationship to a base line, or plane of neutral effect, of each mode.

Throughout the following description, like reference numerals are used to denote like parts of the drawings.

DESCRIPTION OF THE PREFERRED EMBODIMENTS

Figure 1:
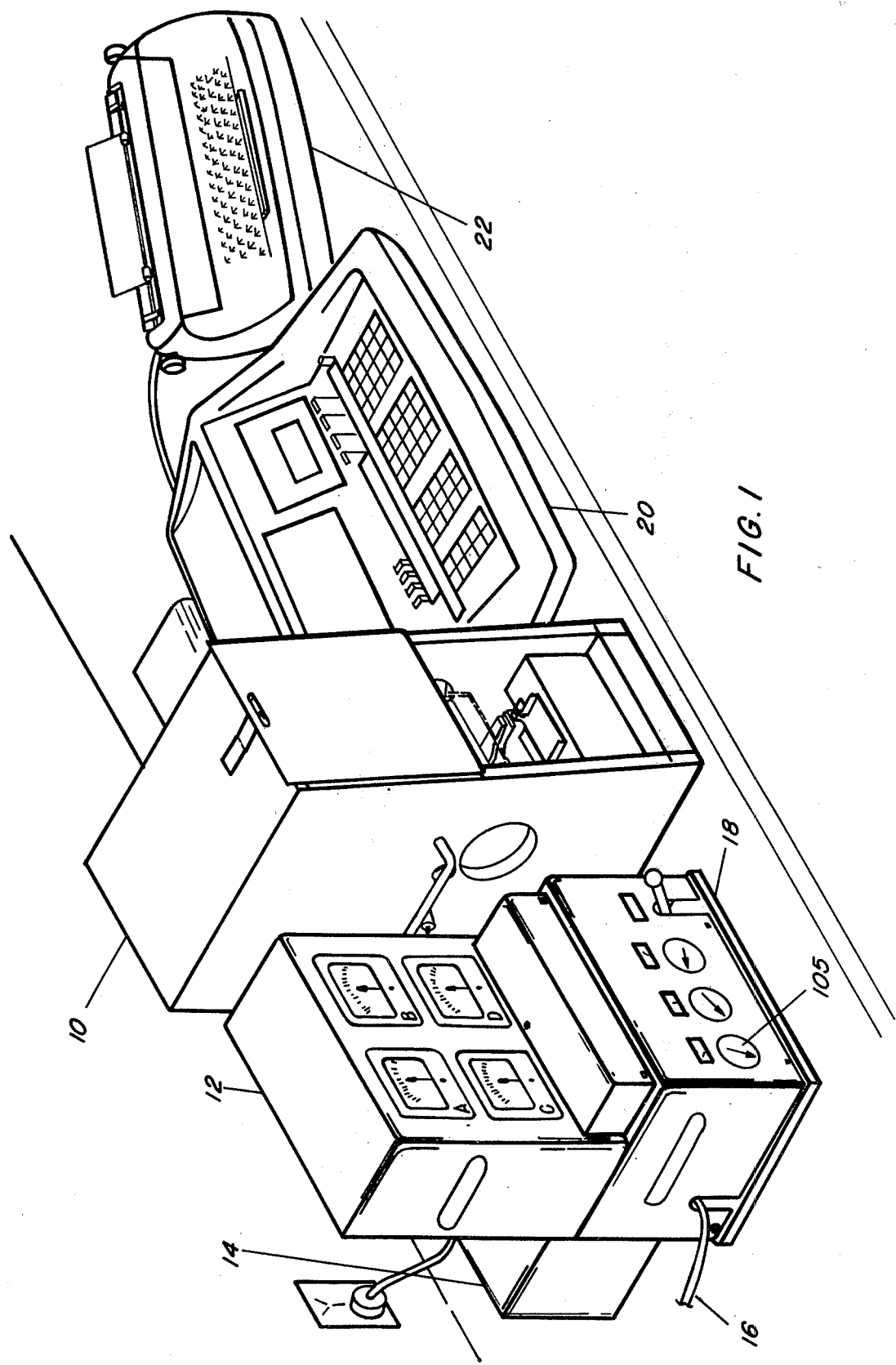
FIG. 1 is an isometric view of the general layout of the tilt tester system.

Referring now to FIG. 1, a basic tiltester gaging apparatus 10, for measuring nozzle tilt, is electrically connected to amplifier assembly 12 and an analog-digital converter group 14. Tiltester 10 is pneumatically connected to air supply line 16 through a penumatic components group 18. A programable calculator 20, such as Model 700A manufactured by Wang Laboratories, Inc., of Tewksbury, Massachusetts, is electrically coupled to the output of the converter group 14 and has its output in turn connected to a printer device 22 such as Model 701 manufactured by Wang Laboratories, Inc.

FIG. 2 represents the exhaust end of a typical rocket nozzle assembly. In this particular cluster there are four nozzles 24A, 24B, 24C and 24D respectively. Generally in order to obtain a device which will provide for adequate accuracy of rocket flight, a maximum allowance of 0°6' for angular error of axial alignment (tilt) of each nozzle is required. Since this tilt can occur in any direction, the maximum gross error effect occurs when the tilt of all four nozzles contributes most to that effect.

Referring to FIG. 3, when the maximum permitted tilt occurs in the direction shown by arrows 26A, 26B, 26C and 26D, there is a total effect on clockwise spin of the rocket of 0°24' tilt assuming the maximum allowance 0°6'.

Likewise, when the maximum permitted tilt occurs in the direction shown by arrows 28A, 28B, 28C and 28D, in FIG. 4, there is a total effect of 0°24' tilt on pitch up.

Also when the maximum permitted tilt occurs in the direction shown by arrows 30A, 30B, 30C and 30D, in FIG. 5, there is a total effect of 0°24' tilt on yaw right.

Referring to the diagrammatic FIGS. 6-9, it can be seen from the tilt examples given that whatever the direction of tilt, it affects all three principal modes of flight characteristics, spin ($\alpha$), pitch ($\theta$) and yaw ($\phi$), in proportion to its angular relationship to the base line, or plane of neutral effect of each mode. In FIGS. 6-9, these planes are those which divide the shaded and blank halves of the three mode rings at each nozzle. The shaded halves, outer, middle and inner rings, 32, 34 and 36, represent spin ($\alpha$) clockwise, pitch ($\theta$) up and yaw ($\phi$) right respectively. The blank halves 32', 34' and 36' represent spin ($\alpha$) counterclockwise, pitch ($\theta$) down, and yaw ($\phi$) left respectively. In the example given in FIG. 6, the arrow A, representing tilt of the nozzle, indicates contributions of a small value of clockwise spin ($\alpha$), a smaller value of pitch ($\theta$) up, and a much larger value of yaw($\phi$) left. Likewise for the example of tilt in the nozzle of FIG. 7, the tilt affects counterclockwise spin ($\alpha$) by a small amount, pitch ($\theta$) up by a smaller amount, and yaw ($\phi$) right by a much larger amount. In the example given in FIG. 8, even though the arrow C is parallel to the arrow B in FIG. 7, the contribution to spin ($\alpha$) changes from small and counterclockwise to large and clockwise. The directional effect upon pitch ($\theta$) and yaw ($\phi$) are the same as shown in FIG. 7. For the example shown in FIG. 9 of downward tilt, there is a sizable effect on clockwise spin ($\alpha$), a direct effect on pitch ($\theta$) down, and no effect on yaw ($\phi$). The tilt effects described in FIGS. 6-9 can be found by use of the formula $$T_E = A_T \sin A_D$$

where $T_E$ = effective tilt angle
$A_T$ = measured angle of tilt
$A_D$ = angle of direction of tilt with reference to the base line of each mode.

The gross effect on each principal mode is equal to the sum of individual effects on each mode. From empirical data, the direction of tilt is sufficiently scattered as to produce a dependable, though unpredictable, averaging of tilt effect. The determination of gross effective tilt by the present equipment taking into account intramodal internozzle averaging permits a fourfold increase in manufacturing tolerance with no decrease in flight accuracy.

Table I below gives a typical example of how the increase in nozzle manufacturing tolerance can be accomplished with no detriment in flight accuracy.

Table I

| Nozzle | $A_T$ Angle of Tilt | Spin $A_D = \alpha$ | | | Pitch $A_D = \theta$ | | | Yaw $A_D = \phi$ | | |
|---|---|---|---|---|---|---|---|---|---|---|
| | | Dir $\alpha$ | CW | CCW | Dir $\theta$ | Up | Down | Dir $\phi$ | Right | Left |
| | | | Effective Tilt (degrees & minutes) | | | | | | | |
| A | 0° 23' | 25° | 9.72 | — | 20° | 7.86 | — | 70° | — | 21.62 |
| B | 0° 24' | 25° | — | 10.15 | 20° | 8.21 | — | 70° | 22.56 | — |
| C | 0° 14' | 65° | 12.68 | — | 20° | 4.78 | — | 70° | 13.16 | — |
| D | 0° 16' | 45° | 11.31 | — | 90° | — | 16.00 | 0° | — | — |
| Totals | 1° 17' | | 33.71 | 10.15 | | 20.85 | 16.00 | | 35.72 | 21.62 |
| Gross Effect | | | 23.56 | — | | 4.85 | — | | 14.10 | — |
| Average | < 0° 20' | | 5.89 | — | | 1.21 | — | | 3.53 | — |

Figure 10:
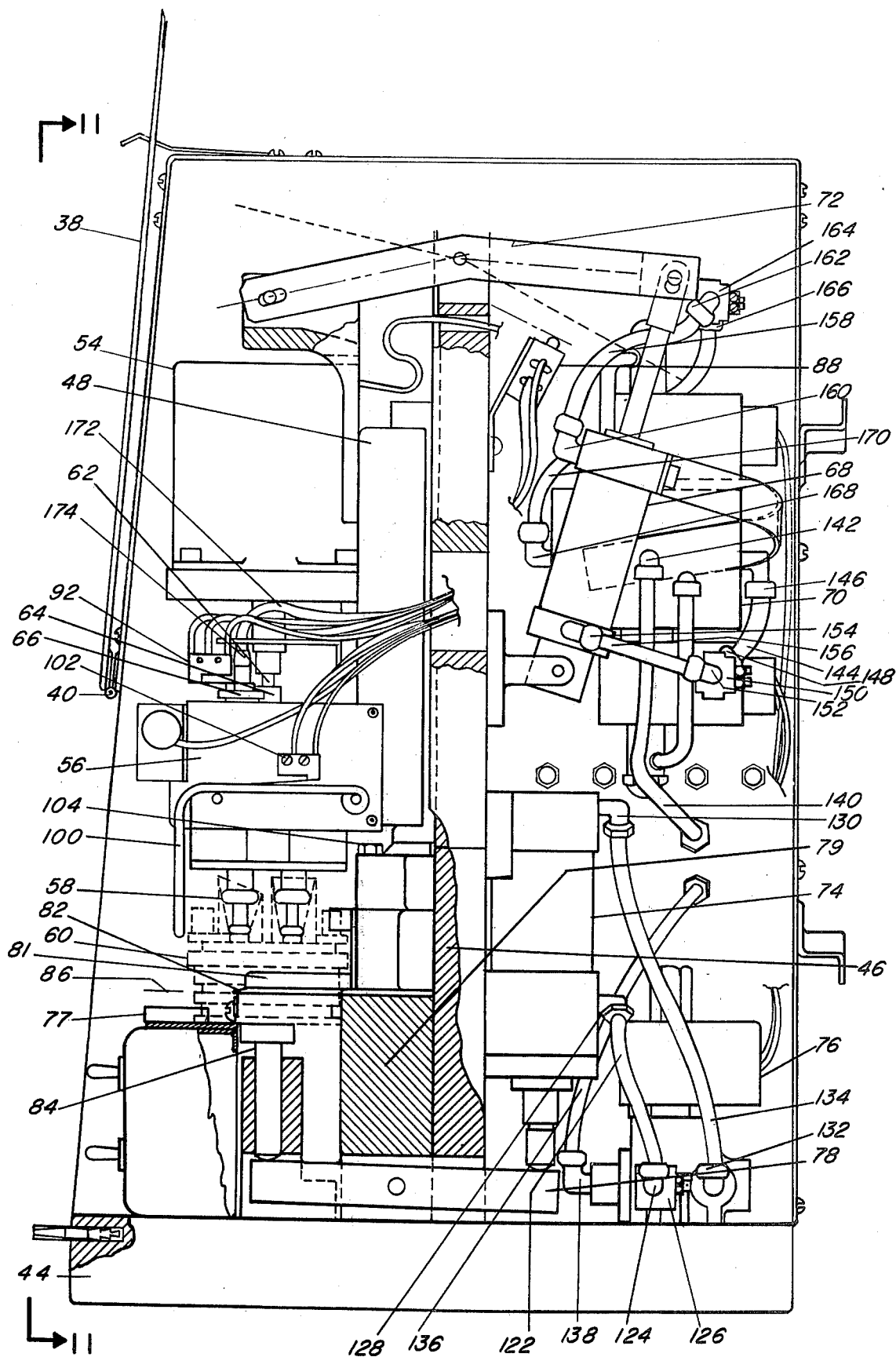
FIG. 10 is an elevational partially cut-away view of the tilt tester gaging equipment in a mid-cycle position.
Figure 11:
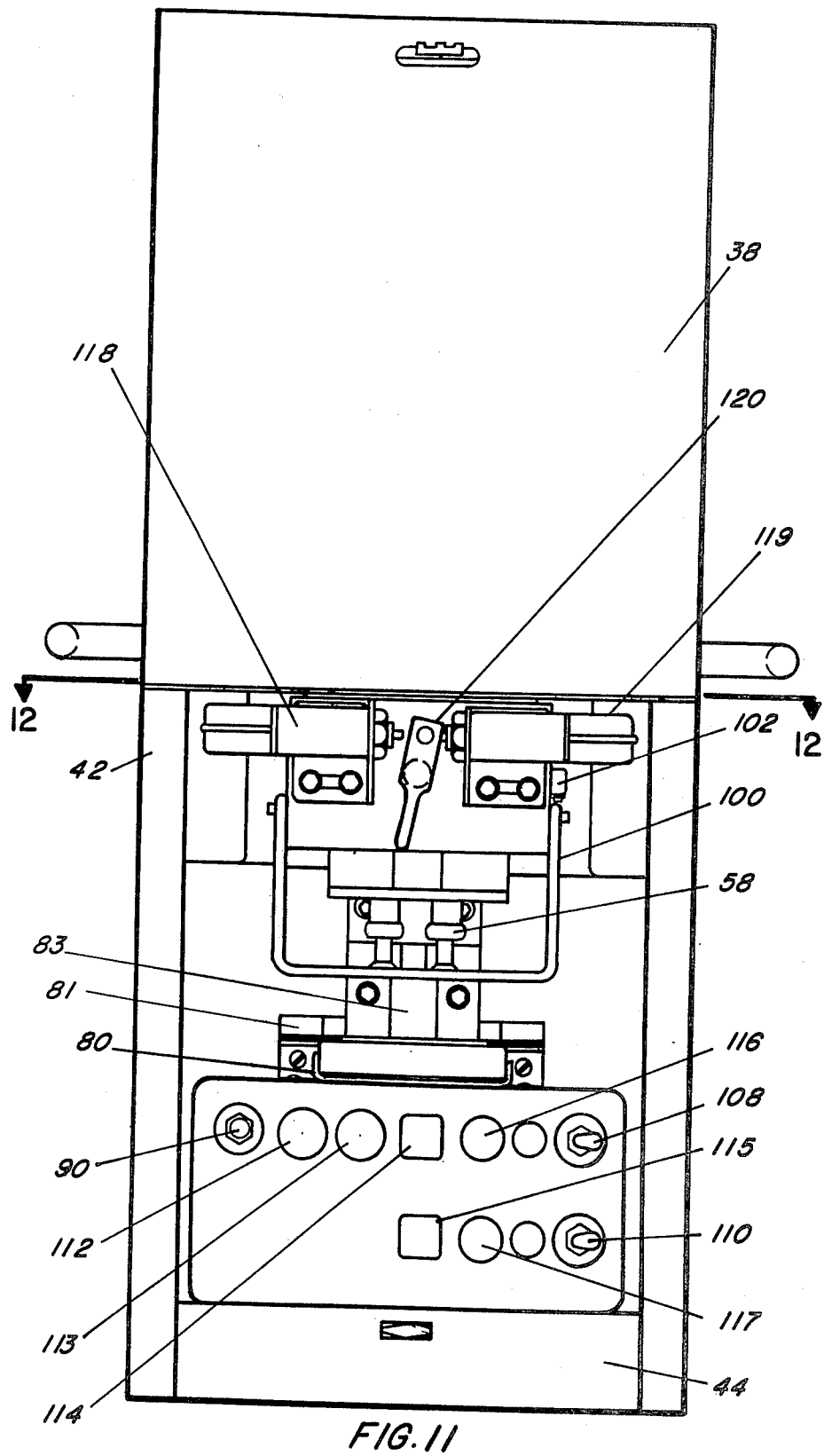
FIG. 11 is a front view of the tilt tester taken along line 11—11 of FIG. 10.
Figure 12:
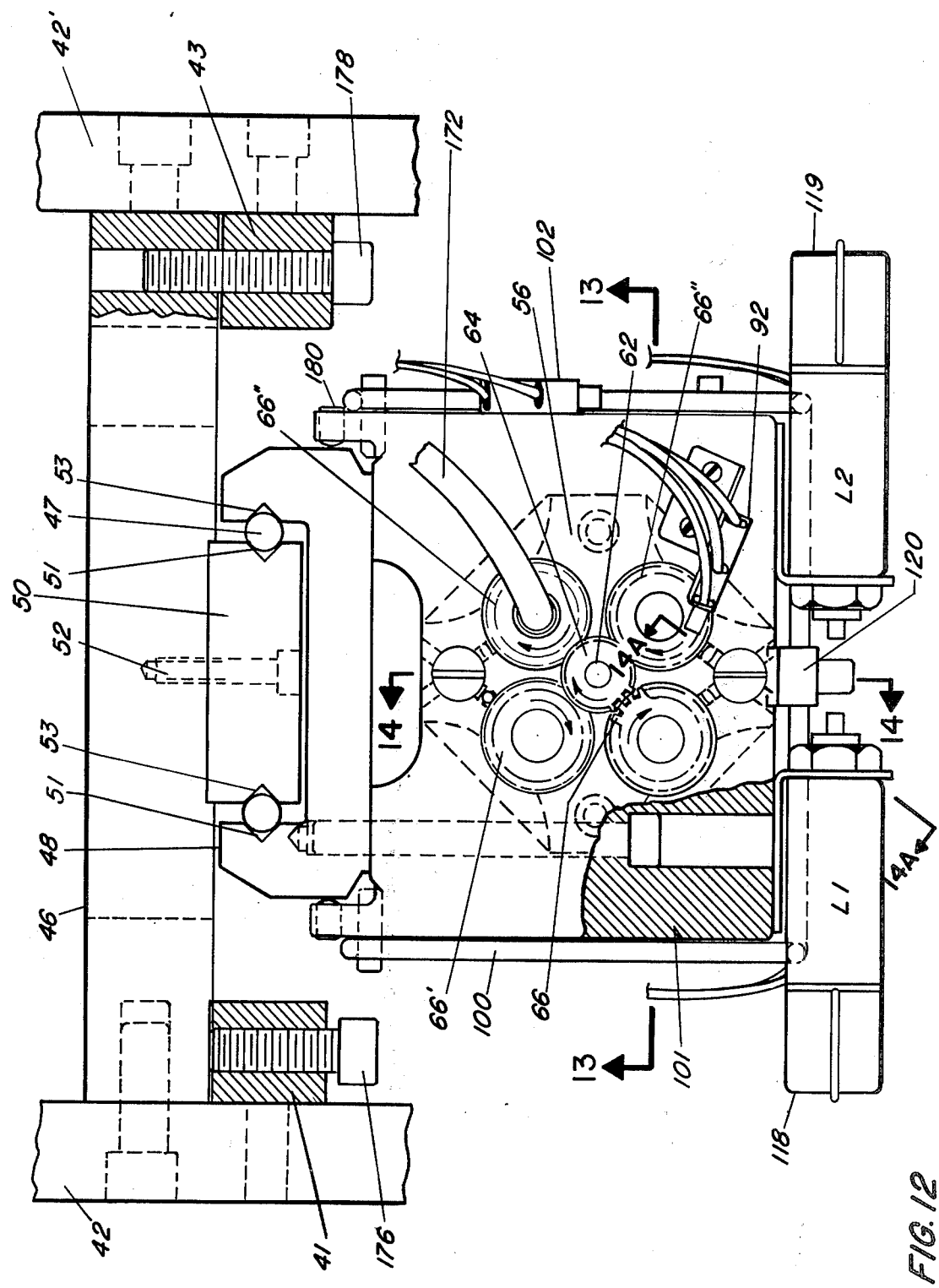
FIG. 12 is a partial sectional view taken along line 12—12 of FIG. 11.

Referring now to FIGS. 10–12, the tilt testing gaging equipment has a front door cover 38 pivotally supported by hinge 40 upon frame members 42 and 42' which are fixedly attached to base 44. A vertical panel member 46 is adjustably attached to vertical members 41 and 43, then fixedly attached to items 42 and 42', and supports at its upper end an outer ball slide member 48 having a U-shaped cross section and an inside race 50 which is fixedly attached to panel 46 by screws 52. A plurality of ball bearings 47 ride in longitudinal grooves 51 and 53 of the outer slide member and inner slide race respectively. A stepping motor 54, such as Model LS50 manufactured by Superior Electric Co. of Bristol, Connecticut, sensor assemblies 56 and probe assemblies 58 are connected to ball slide 48 so that they can be vertically transported toward and away from the work piece 60 shown by dashed lines. A suitable ball slide for this purpose is Model M73 manufactured by Automation Gages, Inc., of Rochester, New York. Stepping motor drive shaft 62 rotates an axialy positioned central gear 64 which in turn meshes with and turns a plurality of peripherally positioned sensor sweep gears 66, 66', 66'' and 66'''. A first pneumatic cylinder 68 is controlled by a four way, three position solenoid valve 70 to advance and retract sensor assemblies 56 by a first linkage mechanism 72. A second pneumatic cylinder 74 is controlled by a four way two position solenoid valve 76 to clamp and unclamp work piece 60 through a second linkage mechanism 78. Air control solenoid valves 70 and 76, such as manufactured by Parker-Hannifin Corp. of Cleveland, Ohio, Models HC 500 and CG200 respectively, are suitable for this purpose. Also pneumatic cylinders 68 and 74, such as manufactured by Parker-Hannifin Corp., Models 5 and 2A respectively may be used. A loading guide 77 helps to orient work piece 60 into the gaging apparatus 10. A U-shaped guide support 79 is fixedly attached to base 44 and supports a U-shaped work piece guide 82 which in turn supports a pair of clamping back-up blocks 81. A work orientation guide 83 is fixedly attached to vertical panel member 46. Back-up block 81 is intermediate orientation guide 83 and work piece guide 82. Work piece 60 is held by clamp assembly 84 against registry surface 86. Microswitch 88 which is activated by movement of linkage mechanism 72 controls the flow of current to first solenoid valve 70 during testing of the work piece 60. Switch 88, whose function is further described herein, also permits release and return of the normally open inspect push button switch 90 to its open position. Probe microswitches 92, 94, 96 and 98 (the latter three not shown in FIGS. 10–12) are positioned above the sensor assemblies 56, so that they will be activated when each of the probe assemblies 58 are properly seated within work piece 60. The outputs of sensor assemblies 56 are electrically coupled into the input of the programable calculator 20 shown in FIG. 1. Safety bar 100 is pivotally mounted on housing 101 and is in contact with safety microswitch 102; the latter actuates the first solenoid valve 70 to return the sensor and probe assemblies 56 and 58 respectively to their retracted position in the event that an obstacle hits the safety bar 100. A stop 104 limits the extreme distance that the ball slide 48 can travel in the direction toward the work piece 60. A power control panel 106 contains power control switch 108 and computer power switch 110, and indicator lights 112, 113, 114, 115, 116, and 117 to indicate the particular function of ready, running, reject, accept, power on and computer on respectively. A pair of stabilizer solenoids 118 and 119 move stabilizer handle 120 so that it can actuate the sensor stabilizer mechanism shown in FIG. 14 into a test or release position. A suitable solenoid for this purpose is manufactured by Dormeyer Industries, Model P-10, at Chicago, Illinois. A pneumatic pipeline 122 connects output connector 124 of check valve 126 to the output connector 128 of second pneumatic cylinder 74. The input connector 130 of second pneumatic cylinder 74 is pneumatically connected to the connector 132 of the second solenoid valve 76 through pneumatic line 134. A pneumatic supply line 136 is connected to the second solenoid valve 76 through input connector 138. An additional pneumatic supply line 140 is connected to the first solenoid valve 70 through input connector 142. Pneumatic pipeline 144 connects the output connector 146 of first solenoid valve 70 to the input connector 148 of check-throttle valve 150. The output connector 152 of check valve 150 is connected to the input connector 154 of first pneumatic cylinder 68 through pipeline 156. The return pipeline 158 is connected to the output connector 160 of first pneumatic cylinder 68 and to the input connector 162 of check-throttle valve 164. The output connector 166 of check-throttle valve 164 is connected to the first solenoid valve 70 through return connector 168 and return pipeline 170. Pneumatic supply lines 172 supply air to the sensor assemblies 56 through rotary air fittings 174. FIG. 12 shows only one of these supply lines 172; the others are not shown going to the sensor assembly 56 for the sake of clarity of the drawing. Screws 176 and 178 are used for panel adjusting and screw 180 is used for the probe sensor housing alignment.

Figure 13:
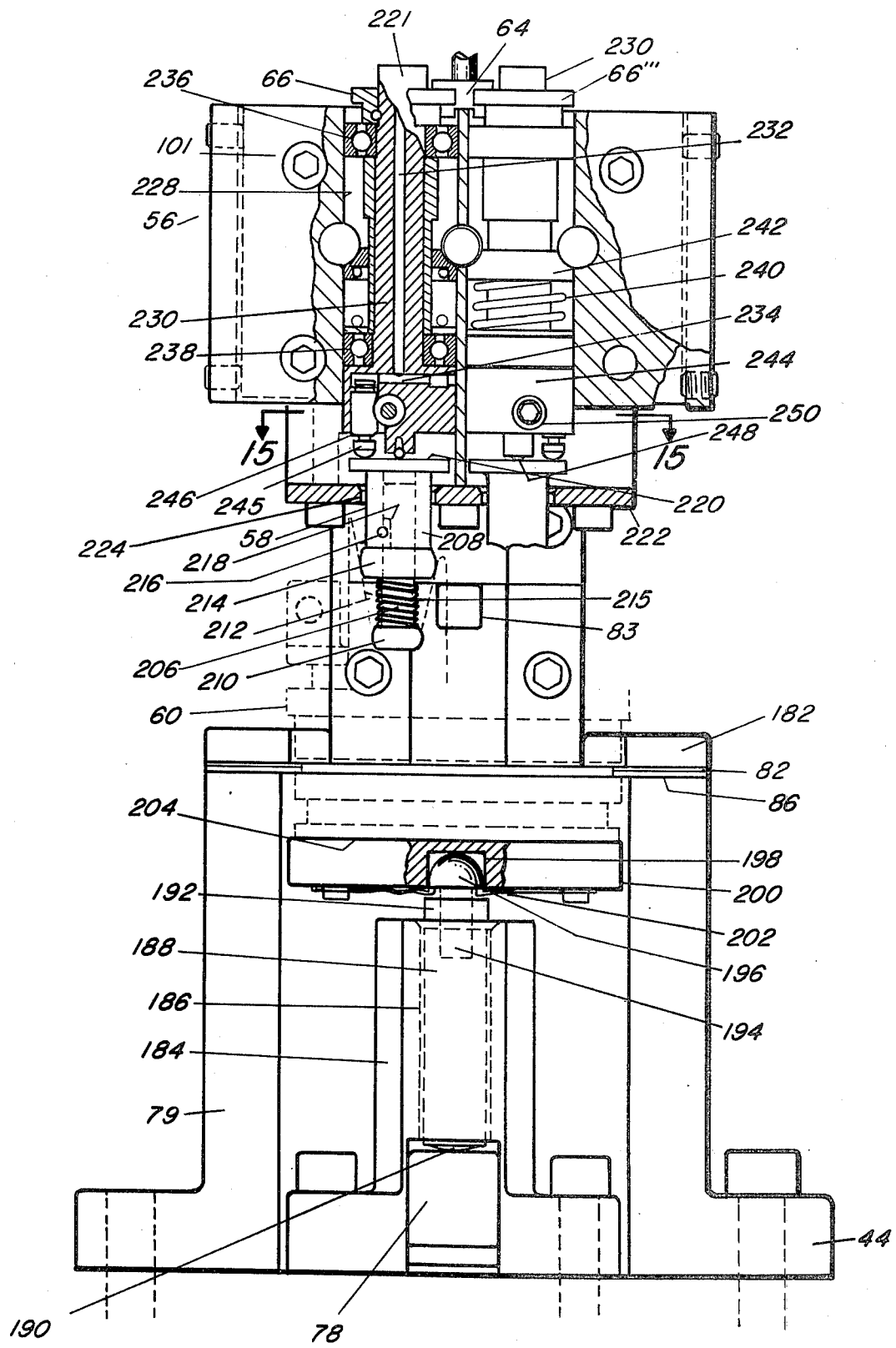
FIG. 13 is a partial sectional view taken along line 13—13 of FIG. 12.

Referring now to FIG. 13 within the U-shaped support member 79 is work clamping cylinder support member 184 which has a longitudinal bore 186 therein. FIG. 13 faces the open end of the U-shaped support member 79. A rod 188 mechanism 78. The other counterbored end 192 fixedly contains therein a stud 194 which has a rounded head 196. The latter fits within an anvil groove 198 of component clamping anvil 200.

The rounded head 196 is retained in the counterbore 198 by anvil retaining spring 202. The articular design of anvil 200 permits the work piece 60 to be held tightly against the registry surface 86 by means of work guide 82 engaging annular work piece groove 205 even though the work piece and surface 204 is not parallel to the registry surface 86. Probe assembly 58 comprises a pin 206 which is axially and biasedly held in a T-shaped sleeve member 208. The head 210 of pin member 206 seats itself in the narrow section of the nozzle throat 212. The annular protrusion 214 on the open end of sleeve 208 seats itself in the enlarged section of the nozzle throat 212. A helical spring 215 provides the biasing force between sleeve 208 and pin 206. A locking pin 216 transversely stakedly positioned in sleeve 208, located in pin groove 218, prevents pin 206 from being ejected from the open end sleeve 208 when there is no work piece in the equipment. A flanged test surface 220 on the closed end of sleeve 208 is normal to the longitudinal axes of sleeve 208 and pin 206. Test surface 220 provides a reference surface for checking the tilt of each nozzle. The probe assemblies 58 are held slidably attached to sensor assemblies 56 by plate 22 which permits sleeve 208 to slide through plate bores 224 but does not allow test surface 220 to pass therethrough. Test surface 220 lies on a plane which is normal to the longitudinal axis of the nozzle throat 212. The assembly housing 101 has a plurality of sensor assembly bores 228 longitudinally positioned therein and normal to the registry surface 86. Rotatably contained within each of the bores 228 are T-shaped rotating shafts 230, each having a longitudinal axial bore 232 communicating with a transverse bore 234. Shaft 230 is slidably positioned in assembly bore 228 by ball bearing races 236 and 238. A helical spring 240 positioned intermediate to collar 242 and lower end 244 of shaft 230 pushes the lower shaft end 244 toward the test surface 220 so that a cartridge air flow metering device 246 and the probe articulating ball 248 are in contact with test surface 220. Shafts 230 are rotated by the driving sensor sweep gears 66, 66', 66'', and 66''' which are fixedly attached to the shaft drive ends 221 and are in turn driven by central gear 64. Restraining clamps 250 hold cartridges 246 fixedly in the shaft lower ends 244 without inhibiting the movement of air flow metering valves 245. A suitable air flow metering valve is Model 60055194 manufactured by Bendix Automation & Measurement Division of Dayton, Ohio.

Figure 14:
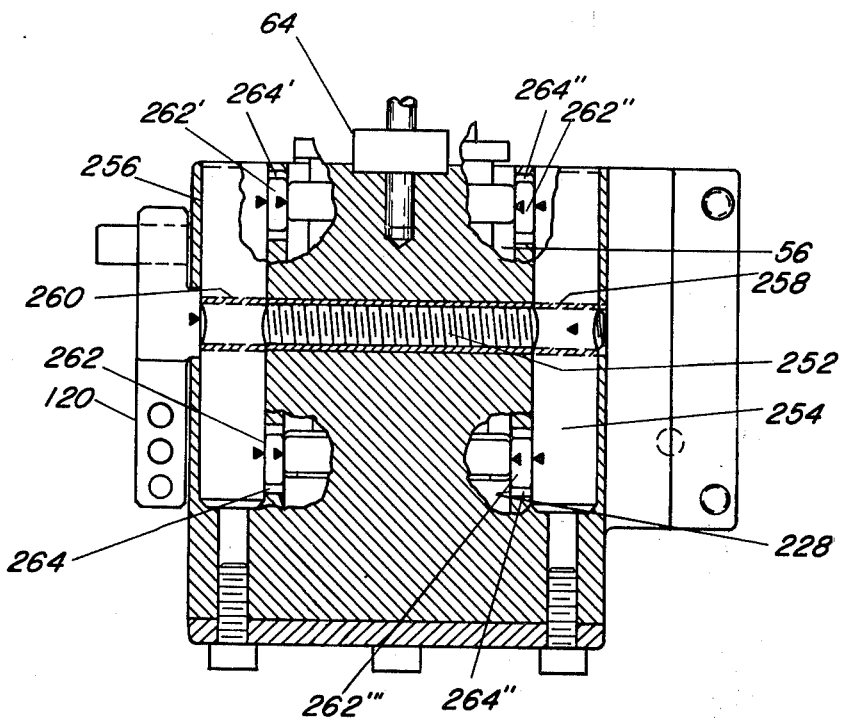
FIG. 14 is a composite sectional view taken along line 14—14 and line 14A-14A of FIG. 12 showing the sensor stabilizer.

FIG. 14 shows a composite view of the clamping mechanism used to allow the sensor assemblies 56 to slide within the sensor assembly bores 228 when sensor and probe assemblies 56 and 58 respectively are lowered to meet the nozzle throat surfaces 212 of the work piece 60, as shown in FIG. 13, and to fix the ball bearing races 236 and 238 and the T-shaped rotating shafts, to which they are fixedly attached, within the bores 228. The clamping action is accomplished when stabilizer solenoid 118 of FIGS. 11 and 12 causes stabilizer handle 120 to rotate threaded shaft 252 within pressure pins 254 and 256. Pressure pin 254 has a threaded bore 258 and pressure pin 256 has a shaft clearance bore 260. A plurality of pressure transfer slugs 262, 262', 262'' and 262''' are located in grooves 264, 264', 264'' and 264''' respectively. Rotation of shaft 252 causes the pins 254 and 256 to be pulled toward each other causing slugs 262–262''' to exert pressure against and to clamp ball races 236 and 238 in a fixed position with respect to sensor assembly bores 228.

Figure 15:
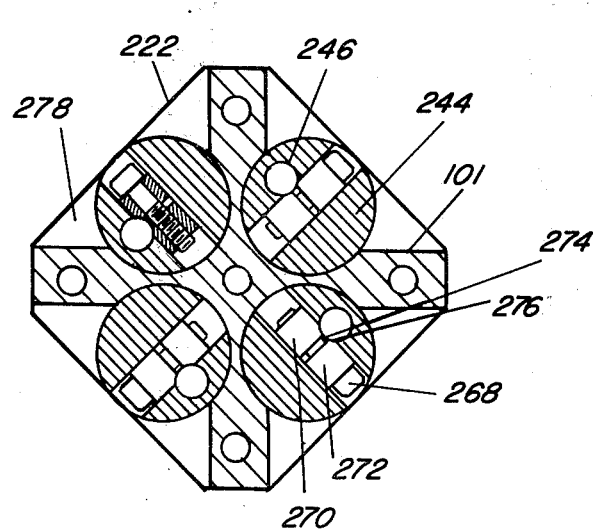
FIG. 15 is a cross-sectional view taken along line 15—15 of FIG. 13.

FIG. 15 shows a cross-sectional view along line 15—15 of FIG. 13 of the means for clamping the cartridge air flow metering devices 246 in the shaft lower end 244. A clamp assembly comprising a bolt 268 is threaded into a threaded bushing 270 through a plain bushing 272. Both the threaded bushing 270 and the plain bushing 272 have cylindrically shaped chambers 274 and 276 thereon which conform to the circumference of the cartridge 246. Cartridge access spaces 278 are provided in housing 101 so that the longitudinal positions of cartridge 246 can be easily adjusted in housing 101 for a particular work piece configuration.

Figure 16:
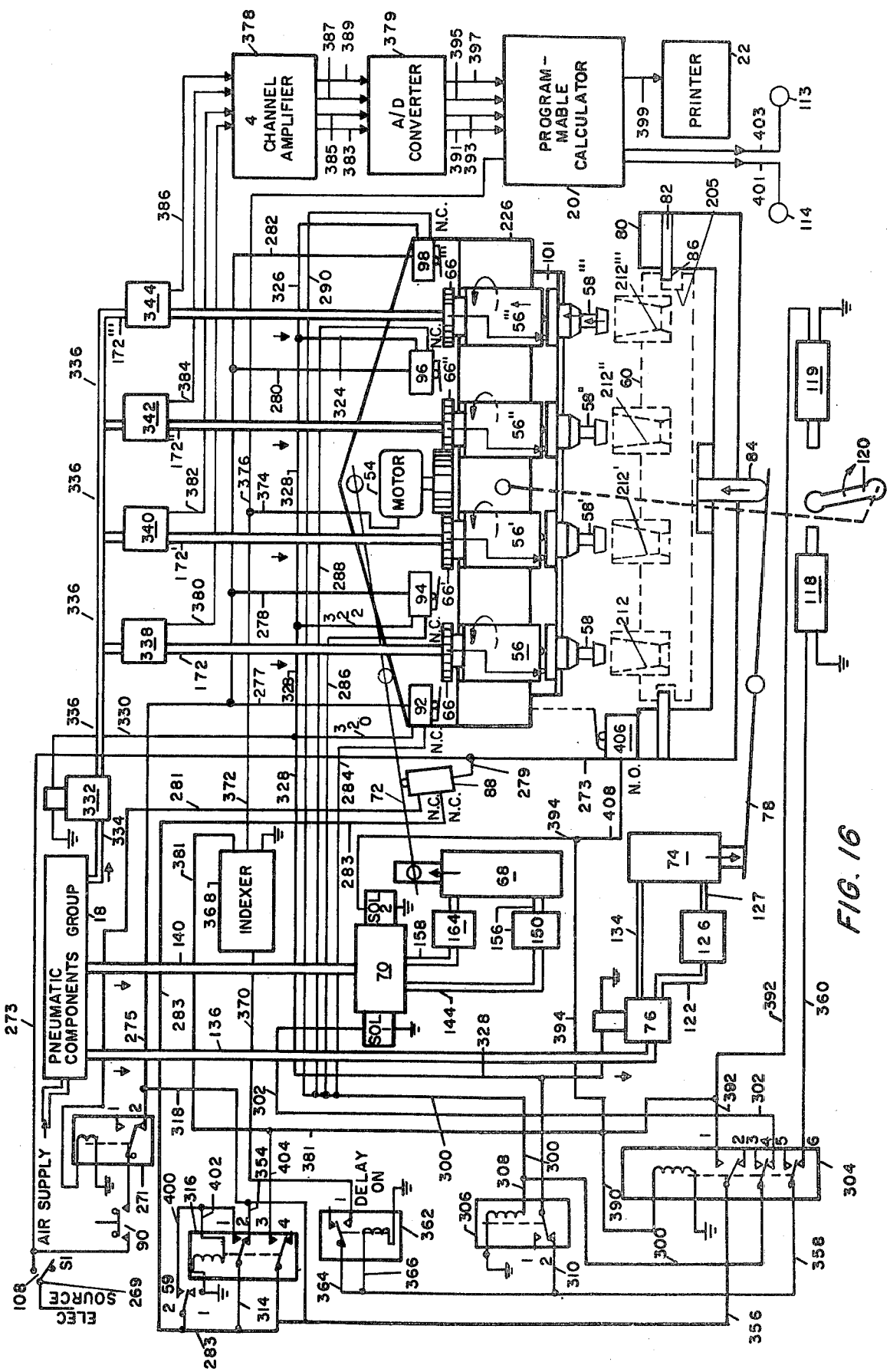
FIG. 16 is an electric-pneumatic diagrammatic drawing of the tilt tester system.

FIG. 16 shows a diagrammatic drawing of the principal operating components of the system. After work piece 60 is loaded into U-shaped work piece guide 82, the testing operation is started by manually closing electrical control switch 108 whose terminal 269 is connected to an electrical source (not shown), and momentarily depressing the normally open push button switch 90. This action energizes solenoid valve 70 through normally closed contact 2 of relay 271 to conductor 275, which is connected to electrical conductors 277, 278, 280 and 282 which are in turn respectively connected to electrical conductors 284, 286, 288 and 290 through the microswitches 92, 94, 96 and 98 respectively. Microswitches 92, 94, 96 and 98 are fixedly attached to sensor housing 101 and are actuated by the relative longitudinal motion of housing 101 toward sensor sweep gears 66–66''' respectively. Electrical conductors 284-290 are connected to conductor 300 which in turn is connected to conductor 302 through normally closed contact 4 of relay 304. Conductor 302 when energized causes solenoid valve 70 to open, permitting air from pneumatic components group 18 which contains air regulators (not shown) and pressure indicators to supply air to line 140 which passes through air line 144 into check-throttle valve 150 and thence to first pneumatic cylinder 68 through air line 156. When the piston of cylinder 68 moves upwardly, the sensor assemblies 56–56''' and the probe assemblies 58–58''' move in a downward direction toward the work piece 60. At the same time, relay 306 is energized through conductor 308 opening up electrical conductor 310. As first cylinder 68 continues to advance, switch 88 is actuated by linkage mechanism 72 causing electrical conductor 273, which is connected to the electrical source at switch 108, to be connected through conductor 279 to conductors 281 and 283. Conductor 281 energizes relays 271 and by so doing removes conductor 275 from the energy source through contact 2 of relay 271 and the need to keep push button 90 depressed during the test. Line 275 remains alternatively energized through the series connection of the conductor 273, through the actuated switch 88, conductor 283, conductor 314, through normally closed contact 2 of relay 316 to conductor 318. As probes 58–58''' seat themselves in nozzles throats 212, 212', 212'' and 212''' respectively, the probe assemblies 58–58''' and the sensor assemblies 56–56''' recede into probe housing 101 and sensor housing 226 respectively. Whichever probe assembly seats itself first in the work piece 60 will actuate its associated microswitch 92, 94 96 or 98, which will in turn energize second solenoid valve 76 through electrical conductors 320, 322, 324 or 326 respectively to the common conductor 328. The four way two position solenoid valve 76 permits air from regulators contained in the pneumatic components group 18 to supply air via pipeline 136 to second pneumatic cylinder 74 through pipeline 134. The actuated cylinder 74 causes the second linkage mechanism 78 to move clamp assembly 84 against work piece 60 so that the latter is firmly held against registry surface 86. At the same time that conductor 328 is energized by the actuation of switches 92, 94, 96 or 98, conductor 330 energizes solenoid valve 332, which permits air from the pneumatic components supply group 18 and pipeline 334 to pass through the solenoid valve 332 into common pipeline 336 and thence to the air-to-electric converters 338, 340, 342 and 344 and finally to the sensor assemblies 56–56''' through pipelines 172, 172', 172'' and 172''' respectively. A suitable air-to-electric converter or transducer for this purpose is the Model "Sheffield Electrojet" manufactured by Bendix Automation & Measurement Division of Dayton, Ohio.

When all probe assemblies 58–58''' become seated in the work piece 60 nozzles, switches 92, 94, 96 and 98 open the electrical path to conductors 284, 286, 288 and 290 and de-energize solenoid 1 of the first solenoid valve 70, returning it to a neutral position while keeping the first pneumatic cylinder 68 in its extended state. The opening up of conductors 284, 286, 288 and 290 de-energizes relay 306 and in so doing closes contact 2 of relay 306 so that stabilizer solenoid 118 is energized via conductor 358, contact 6 of relay 304, and conductor 360. Sensor assemblies 56–56''' are stabilized or clamped by movement of stabilizer handle 120 in a clockwise direction by the stabilizer solenoid 118. In addition, a delay-on type relay 362 is enabled by conductors 364 and 366. The enabled relay 362 energizes an indexer 368 such as Model SA1800-3 manufactured by Superior Electric Co. of Bristol, Connecticut, through contact 1 of relay 362 and conductor 370. Indexer 368 generates a plurality of voltage pulses of a first given amplitude and duration in a first period of time, and a final pulse of a different amplitude and/or duration after the first period of time. The output signals of indexer 368 are fed to a stepping motor 54 via conductors 372 and 374. The stepping motor 54 is pulsed by indexer 368 so as to cause sensor assemblies 56–56''' to rotate one revolution in 500 steps. The same output signals of indexer 368 are fed to the programable calculator 20 via conductors 372 and 376. The outputs of transducers 338, 340, 342 and 344 are fed to the input of a 4 channel amplifier 378 through conductors 380, 382, 384 and 386 respectively. The output of amplifier 378 is fed to the input of an analog-digital converter 379 by conductors 383, 385, 387 and 389 and the converter's output is fed by conductors 391, 393, 395 and 397 to the input of the calculator 20 which is programmed to store the modulated signals of the transducers 338, 340, 342 and 344 and the compass direction mechanism of the indexer 368 at each step. These modulated signals have electric current values that represent trigonometric functions of the possible angular tilt of each nozzle throat 212-212''' and the angular position of rotation of respective sensor assemblies 56–56''' at each step. At the last pulse from the indexer 368, conductors 374 and 376 are de-energized and conductor 381 is energized. Relay 304 is energized by the last pulse output signal of indexer 368 via conductor 381 and conductor 390. Energizing of relay 304 opens relay contacts 4 and 6 and closes contact 1 so that second stabilizer solenoid 119 is energized through conductor 392, contact 1 of relay 304, conductors 356 and 354, contact 2 of relay 316, conductors 314 and 283 through switch 88 to conductor 273. Solenoid 119 when energized moves stabilizer handle 120 in a counterclockwise direction and unclamps sensor assemblies 56–56'''. Solenoid 2 of the first solenoid valve 70 is also energized by the last pulse signal of indexer 368, being connected thereto via conductors 381 and 394. Solenoid 2 of valve 70 causes first solenoid valve 70 to shift position so that air from the pneumatic components supply group 18 is fed from pipeline 140 to pipeline 158 through check-throttle valve 164 to first cylinder 68. Cylinder 68 causes the linkage mechanism 72 to withdraw the sensor assemblies 56–56''' and probes 58–58''' from work piece 60. The movement of linkage mechanism 72 causes switches 92, 94, 96 and 98 to return to their original positions, opening up conductors 320, 322, 324 and 326 and thereby de-energizing the solenoid valve 76, which redirects air from pipeline 136 through pipeline 122, check-throttle valve 126, pipeline 127 to second pneumatic cylinder 74 which moves linkage mechanism 78 so that clamp assembly 84 releases work piece 60. The calculator 20 then computes the composite or average effect of tilt ($T_E$) on spin, pitch and yaw components of rocket flight; i.e., it multiplies the trigonometric function of the greatest angular aberration of each nozzle throat axis ($A_T$) by the sine of its respective angle of sensor probe rotation (Sin $A_D$), and then calculates the vectorial sum for each flight component and compares the same with predetermined limits. It then gives an accept or reject signal indication via conductors 401 or 403 on visual indicators 114 or 113 respectively, such as a green lamp for accept and a red lamp for reject, and on command, delivers signals via conductor 399 to printer 22 which prints out such of the foregoing calculations as are preselected by the user. As first cylinder 68 continues to retract, the first switch of switches 92, 94, 96 and 98 which returns to its original inactive position will re-energize relay 306 through conductors 284, 286, 288 or 290 respectively and through conductors 300 and 308. The enabling of relay 306 opens up line 310 and de-energizes relay 362 which in turn inactivates indexer 368. With switches 92, 94, 96 and 98 in their original inactive positions, lines 328 and 330 are de-energized, which also de-energizes air control solenoid valve 332 and it in turn cuts off the air supply to sensor assemblies 56–56'''. The opening up of line 328 also de-energizes solenoid valve 76, causing the second cylinder 74 to retract and release work piece 60. When the first cylinder 68 completes its retraction, switch 88 de-energizes conductors 283 and 281, thus removing the energy supply source from the gaging apparatus and ending the test. In the event that safety bar 100 shown in FIGS. 10, 11 and 12 strikes an obstruction at the start of the test, the normally open microswitch 102 will be actuated to energize relay 316 via conductors 400 and 402. Relay 316 will shift from contacts 2 and 4 to contacts 1 and 3, thereby energizing relay 304 via conductors 404, 381 and 390. In addition, solenoid 2 of solenoid valve 70 will be energized via conductors 404, 381 and 394 to start the retraction of the first cylinder 68 and the sensor and probe assemblies 56–56''' and 58–58''' respectively. In the event that ball slide 48 of FIG. 10 strikes normally open microswitch 406, relay 304 will again be energized through conductors 408, 394, 381 and 390 and solenoid 2 of solenoid valve 70 will be energized via conductors 408 and 394 causing retraction.

The foregoing disclosure and drawings are merely illustrative of the principles of this invention and are not to be interpreted in a limiting sense. I wish it to be understood that I do not desire to be limited to the exact details of construction shown and described for obvious modifications will occur to a person skilled in the art.

Having thus fully described the invention, what is claimed as new and desired to secured by Letters Patent of the United States is:

1. An apparatus for measuring a composite effect of tilt, in individual nozzles of a rocket, on spin, pitch and yaw in a multi-nozzle work piece for determining acceptance or rejection of said work piece which comprises:
    housing means;
    electro-pneumatic gaging menas, operatively disposed in said housing means, for determining the magnitude and direction of said tilt of said individual nozzles;
    programmable calculator means for receiving and storing the output signals from said gaging means and then generating output signals in response thereto;
    visual signal means electrically connected to said calculator means for indicating acceptance or rejection of said work piece, said visual signal means indicating acceptance of said multi-nozzle work piece, when said calculator means calculates a vectorial sum for each flight component of spin, pitch and yaw which does not exceed a predetermined limit, and said visual signal means indicating rejection of said multi-nozzle work piece, when said calculator means calculates a vectorial sum for each flight component of spin, pitch and yaw which exceeds a predetermined limit; and
    printing means for making a record of the arithmetic equivalent of said output signals produced by said calculator means.

2. An apparatus as recited in claim 1 wherein said gaging means comprises:
    guide means for holding said work piece against a registry surface;
    probe means for contacting the nozzle throats of said work piece and orienting a test surface of said probe means so that each test surface lies in a plane perpendicular to the longitudinal axis of each nozzle throat;
    sensor means for rotatably scanning the test surface of said probe means for tilt, said sensor means delivering an output signal responsive to said tilt to said calculator means;
    indexing means for rotating said sensor means in a plurality of steps and for generating an output signal in phase with said steps;
    slider means for positioning said sensor and probe means in axial alignment with the nozzles of said work piece and for retracting said sensor and probe means therefrom;
    first lever means for moving said sensor means and said probe means toward said work piece at the start of a test interval and for retracting said sensor means and probe means at the completion of said test interval;
    second lever means for moving said work piece against said registry surface;
    clamping stabilizer means for holding said sensor means in a fixed position during said test interval and for releasing said sensor means after completion of said test interval;

first fluid pressure cylinder means for actuating said first lever means;

second fluid pressure cylinder means for actuating said second lever means;

first solenoid valve means for controlling air flow to said first pressure cylinder means;

second solenoid valve means for controlling air flow to said second pressure cylinder means;

third solenoid valve means for controlling the input to said sensor means; and switching means for closing and opening a plurality of electrical circuits which actuate and control the sequential operation of said gaging means;

3. An apparatus as recited in claim 2 wherein said guide means comprises:

a base;

a U-shaped guide support member fixedly attached to said base;

a U-shaped work piece guide having a registry surface thereon positioned on said U-shaped guide support member;

a pair of clamping back-up blocks positioned on top of said work piece;

a clamping cylinder support member having a longitudinal bore therein fixedly attached to said base within said U-shaped guide support member;

a rod slidably fitting into said bore, said rod having one end which protrudes through said longitudinal bore and contacts said second lever means, a second end having a counterbore therein;

a stud fixedly positioned in said second end having a rounded head therein;

an articulating anvil means rotatably supported by the rounded head of said stud, holding said work piece against said registry surface when said second lever means exerts an upward force against the first end of said rod.

4. An apparatus as recited in claim 2 wherein said probe means comprises:

a plurality of T-shaped sleeve members having on a closed end a transverse test surface which is normal to the longitudinal axis of said sleeve member, and an annular protrusion peripherally located on an open end of said sleeve members;

a plurality of pin members having a head thereon smaller than the annular protrusion of said sleeve members, biasedly and slidably positioned in said sleeve members;

detent means for holding said pin members in said sleeve members when said probe means is withdrawn from said work piece.

5. An apparatus as recited in claim 2 wherein said sensor means comprises:

a housing having a plurality of longitudinally positioned housing bores therein, said housing bores normal to said registry surface;

a plurality of inverted T shaped shafts rotatably supported in said bores, said shafts having a drive end and a lower sensor end, an axial longitudinal bore therein and a transverse bore communicating with said longitudinal bore;

a sweep gear fixedly attached to each of said drive ends being driven by said indexing means;

an air flow metering valve fixedly positioned in said lower end that pneumatically scans the periphery of the test surface of said sleeve member and communicates a pneumatic signal through the transverse and longitudinal bores of said shaft;

an air to electric transducer means pneumatically connected to said longitudinal bore of said T shaped shaft for receiving said pneumatic signal from said metering valve; and two ball bearing race means for slidably and rotatably supporting each of said T shafts in said housing bores.

6. An apparatus as recited in claim 2 wherein said slider means comprises:

an inner slide race member fixedly attached to said housing means, said race having a first pair of parallel spaced longitudinal grooves therein;

an outer ball slide member having a second pair of oppsitely disposed longitudinal grooves therein; and a plurality of ball bearings positioned within said first and second grooves intermediate said inner and outer slide members.

7. An apparatus as recited in claim 2 wherein said indexing means comprises:

a voltage pulsing means for generating a plurality of voltage pulse signals of a given amplitude in a first period of time, and a final pulse of different amplitude and duration after said first period of time; and a stepping motor responsive to said pulsing means signals for rotating said sensor means through said first period of time.

* * * * *